United States Patent [19]

Onda et al.

[11] 4,322,524

[45] Mar. 30, 1982

[54] CYANOETHYLPULLULAN

[75] Inventors: Yoshiro Onda; Hiroaki Muto, both of Joetsu; Hiroshi Suzuki, Niigata, all of Japan

[73] Assignee: Shin-Etsu Chemical Co. Ltd., Tokyo, Japan

[21] Appl. No.: 168,269

[22] Filed: Jul. 10, 1980

[30] Foreign Application Priority Data

Jul. 23, 1979 [JP] Japan .................................. 54-93557

[51] Int. Cl.$^3$ ............................................. C08B 37/00
[52] U.S. Cl. .................................... 536/55; 536/120; 536/18
[58] Field of Search ................... 536/120, 114, 116, 1, 536/18, 55; 424/361

[56] References Cited

U.S. PATENT DOCUMENTS

| | | | |
|---|---|---|---|
| 2,972,609 | 2/1961 | Hogle | 536/43 |
| 3,282,922 | 11/1966 | Touey et al. | 536/116 |
| 4,167,623 | 9/1979 | Fujita et al. | 536/1 |
| 4,174,440 | 11/1979 | Fujita et al. | 536/120 |

*Primary Examiner*—Blondel Hazel
*Attorney, Agent, or Firm*—Toren, McGeady & Stanger

[57] ABSTRACT

The present invention provides a novel compound cyanoethylpullulan which is a cyanoethylation product of pullulan. Pullulan is readily cyanoethylated by the reaction with acrylonitrile in the presence of an alkali catalyst such as sodium hydroxide.

The cyanoethylpullulan having a degree of cyanoethylation of at least 50% has various unique properties in the heat resistance, solubility in organic solvents, film-forming property, adhesive bonding to metals and the like in comparison with related cyanoethylated products such as cyanoethylcellulose and cyanoethylated polyvinyl alcohol.

2 Claims, 4 Drawing Figures

CYANOETHYLPULLULAN

BACKGROUND OF THE INVENTION

The present invention relates to a cyanoethylpullulan which is a novel high-polymeric compound hitherto not known or not described in any prior art literatures. The invention also relates to the method for the preparation of it. The inventive cyanoethylpullulan has very unique properties and is useful as shaped in films or sheets or as a binder agent in some specific electric applications by virtue of its remarkably high dielectric constant, especially, when the degree of cyanoethylation in 50% or higher.

SUMMARY OF THE INVENTION

The starting material of the inventive cyanoethylpullulan is pullulan which is obtained as a natural biological product and has a chemical structure composed of a repetition of the units of maltotriose. Pullulan is readily cyanoethylated when reacted with acrylonitrile in the presence of an alkali catalyst to give the inventive cyanoethylpullulan which is expressed by the following structural formula (I), in which n is a positive integer, say, from 20 to 4000 and X is a hydrogen atom or a cyanoethyl group with the degree of cyanoethylation, i.e. the ratio of the number of the cyanoethyl groups to the total number of the hydrogen atoms and cyanoethyl groups represented by the symbol X, being controllable by the reaction conditions to reach 90% or higher.

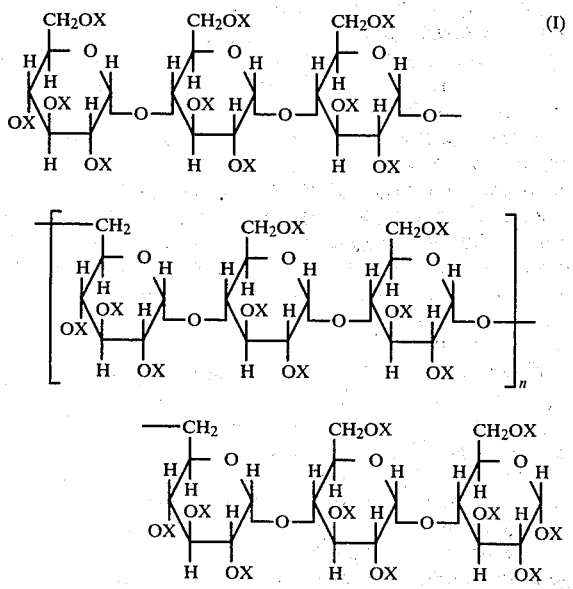

DETAILED DESCRIPTION OF THE PREFERRED EMBODIMENTS

Figure 1:
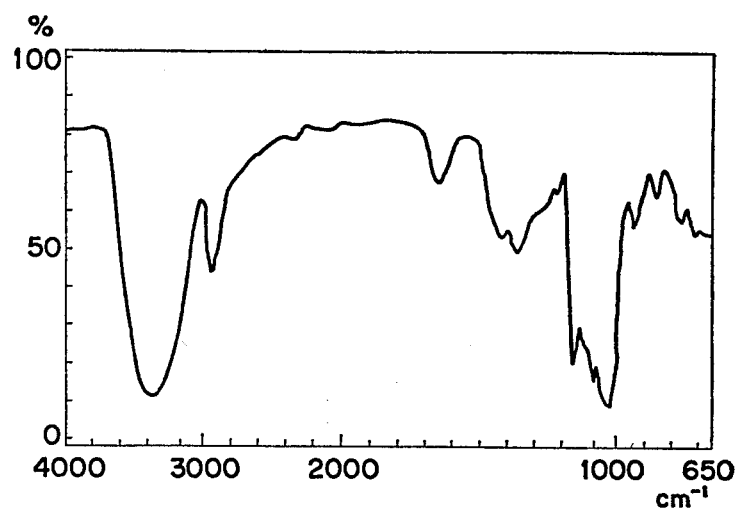
FIG. 1 is an infrared absorption spectrum of pullulan as the starting material of the inventive cyanoethylpullulan.

As is mentioned above, the starting material of the inventive cyanoethylpullulan is pullulan which is obtained by culturing a fungus belonging to the genus of Pullularia as a viscous excreta outside the fungus body and readily separated and collected. The chemical structure of pullulan is composed of recurring units of maltotriose which in turn is a trimer of glucose. The linkage between the maltotriose units is α-1,6 linkage different from the linkages between the glucose units within the maltotriose unit.

Different from starch and the like composed also of the recurring glucose units, pullulan is soluble not only in hot water but also in cold water but the viscosity of the aqueous solution of pullulan is relatively low. Pullulan has excellent film-forming property to give films of high transparency and is also excellent in plasticity and adhesive bonding to substrate. Pullulan is available as a commercial product having a molecular weight in the range from 50,000 to 2,000,000 which corresponds to the number of the recurring maltotriose units of about 20 to 4,000.

On the way of their investigations on the reactivity of this pullulan with various chemicals, the inventors have arrived at a discovery that pullulan is readily cyanoethylated with acrylonitrile in the presence of an alkali catalyst to give a novel polymeric compound hitherto not known in the art, which compound has been identified to be a cyanoethylpullulan expressed by the above given structural formula (I).

The alkali catalyst used for accelerating the cyanoethylation of pullulan with acrylonitrile is exemplified by sodium hydroxide, potassium hydroxide, sodium carbonate, potassium carbonate and the like, among which sodium hydroxide is the most preferred.

The amount of acrylonitrile to be used may differ widely depending on the desired degree of cyanoethylation. It is usually desirable to use acrylonitrile in an amount of at least 3 moles or, preferably, at least 5 moles per mole of the anhydrous glucose units in the starting pullulan to obtain a degree of cyanoethylation of at least 50%. When an excessive amount of acrylonitrile is used in the cyanoethylation, it serves simultaneously as a reactant and as a solvent.

The cyanoethylation reaction of pullulan is carried out in either one of the following two methods. Firstly, pullulan is dissolved in 2 to 20 times by weight of an aqueous solution of sodium hydroxide in a concentration of about 2 to 20% and acrylonitrile and an organic solvent miscible with both acrylonitrile and water are added into the aqueous solution so that the exothermic reaction of cyanoethylation proceeds even at room temperature. Secondly, pullulan is dispersed in a mixture composed of acrylonitrile and an organic solvent such as hexane, benzene and the like and an aqueous solution of sodium hydroxide is added to the dispersion of pullulan in such an amount that the amount of water in the reaction mixture is from 10 to 50% by weight and the amount of the sodium hydroxide in the reaction mixture is from 1 to 10% by weight both based on the pullulan followed by heating the reaction mixture at 40° to 60° C. to effect the cyanoethylation reaction.

After completion of the reaction, the reaction mixture is neutralized by adding a suitable acid such as acetic acid and then poured into a large volume of water with agitation to precipitate the cyanoethylpullulan. This cyanoethylpullulan product is purified, for example, by repeatedly washing with water but it is optional to obtain a purified cyanoethylpullulan by dissolving the crude product in acetone followed by reprecipitation with water. The thus purified cyanoethylpullulan is dehydrated and dried into a final product.

The cyanoethylpullulan of the present invention has unique properties as follows. For example, (1) it has a high decomposition temperature and is excellent in heat resistance, (2) the solubility of it in acetone or other organic solvents is high and clear; transparent films can be prepared by casting of the solution or other methods, (3) it has an adequate plasticity and good adhesive strength to be bonded strongly with metals or other substrates, and (4) it has a high dielectric constant owing to the presence of the polar groups introduced into the structure similarly to the other cyanoethylated polymeric compounds.

Utilizing the above described unique characteristic features, cyanoethylpullulan of the present invention finds applications in the forms of films, sheets, coating films, cellular foamed bodies and the like directed for general uses as well as in the electric fields where high dielectric constants are essential such as the applications as a binding agent for electroluminescence devices and in storage batteries for small scale power supply.

In the following, the present invention is described in further detail by way of examples. In the description hereunder, parts by weight and % by weight are given merely as parts and %, respectively.

EXAMPLE 1

Into a flask equipped with a stirrer were introduced 1 part of pullulan having an average molecular weight of about 100,000 (Pullulan PF-10, a product by Hayashihara Kenkyusho) and 10 parts of a 5% aqueous solution of sodium hydroxide to form an aqueous alkaline solution of pullulan, into which a mixture of 7.5 parts of acrylonitrile and 7.5 parts of acetone were added and the reaction was carried out by keeping the above reaction mixture at 15° to 20° C. for 24 hours with agitation.

In the next place, the reaction mixture was neutralized by adding 0.75 part of glacial acetic acid and poured into water with vigorous agitation to precipitate the cyanoethylpullulan. This crude product was washed repeatedly with water, dissolved in acetone, reprecipitated in water and collected by filtration followed by drying under reduced pressure to give 1.66 parts of white, purified cyanoethylpullulan. The nitrogen content of this product as determined by the Kjeldahl method was 12.1%, from which value the average degree of substitution per anhydrous glucose unit and the degree of cyanoethylation were calculated to be 2.59 and 86.3%, respectively.

Figure 2:
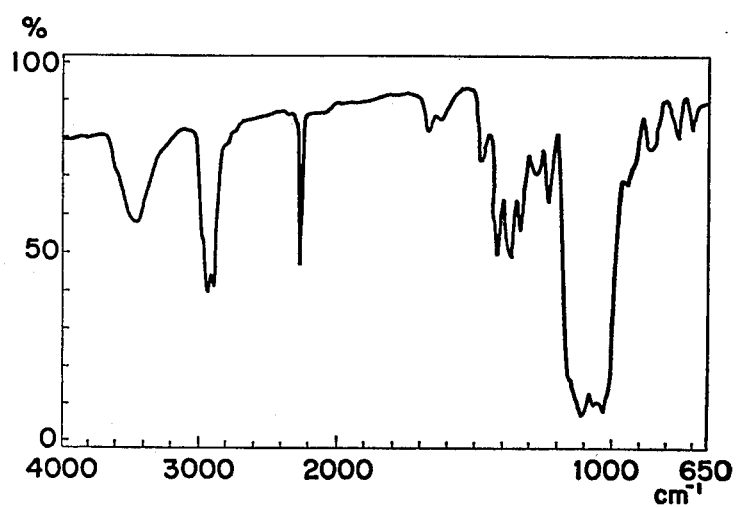
FIG. 2 is an infrared absorption spectrum of the inventive cyanoethylpullulan.

The infrared absorption spectra of the starting pullulan and the cyanoethylpullulan thus obtained are shown in FIG. 1 and FIG. 2 respectively.

Further, several properties of the cyanoethylpullulan per se, i.e. thermal decomposition temperature and solubility in various organic solvents as well as the properties of the film shaped with the cyanoethylpullulan were examined to give the results set out in the table below. The procedures for the measurements of the above properties were as shown below. In the table, the properties of two related cyanoethylated products, i.e. a cyanoethylcellulose and a cyanoethylated polyvinyl alcohol, are also shown. The synthetic procedures of these related products are described below.

Thermal decomposition temperature: the temperature of weight decrease initiation of the sample by a thermobalance was recorded.

Solubility in organic solvents: 2 g of the sample was shaken with 100 ml of the solvent at room temperature and the results were graduated as A to D in the following criteria.
A: complete dissolution to give a clear solution
B: dissolved but to give a cloudy solution
C: swelling only
D: insoluble at all Meanwhile, this cyanoethylpullulan product was insoluble in hydrocarbon solvents, alcohols and esters and the dielectric constant of the film shaped therewith was about 20.

Preparation of films: the sample was dissolved in dimethylsulfoxide and the solution was cast on an aluminum plate and dried at 90° C.

Adhesion of film: in the above procedure of film preparation, the adhesion of the thus formed film with the aluminum plate was examined.

Heat resistance of film: the film was heated at 130° C. for 3 hours and the state of the thus heated film was visually examined.

Figure 3:
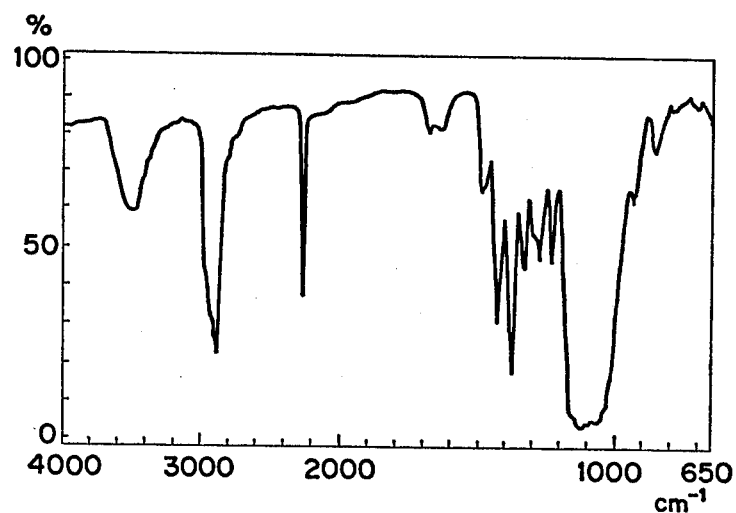
FIG. 3 is an infrared absorption spectrum of a cyanoethylcellulose as a related compound of cyanoethylpullulan.

Preparation of cyanoethylcellulose (cf. U.S. Pat. No. 2,972,609 and Japanese Patent Publication 40-21158): a powdery regenerated cellulose having an average degree of polymerization of about 300 was dipped in 25 times by weight of a 1.25% aqueous solution of sodium hydroxide at room temperature for 30 minutes followed by squeezing to give mercerized cellulose weighing 2.5 times of the starting regenerated cellulose. Into a flask equipped with a stirrer were introduced 2.5 parts of the mercerized cellulose and 18 parts of acrylonitrile and the reaction was carried out by heating the reaction mixture at 65° C. for 1 hour with agitation followed by neutralization with addition of 0.1 part of glacial acetic acid. Purification, dehydration and drying were carried out in the same manner as in Example 1 to give 1.71 parts of white cyanoethylcellulose, of which the nitrogen content as determined by the Kjeldahl method was 12.5% and the infrared absorption spectrum was as shown in FIG. 3.

Figure 4:
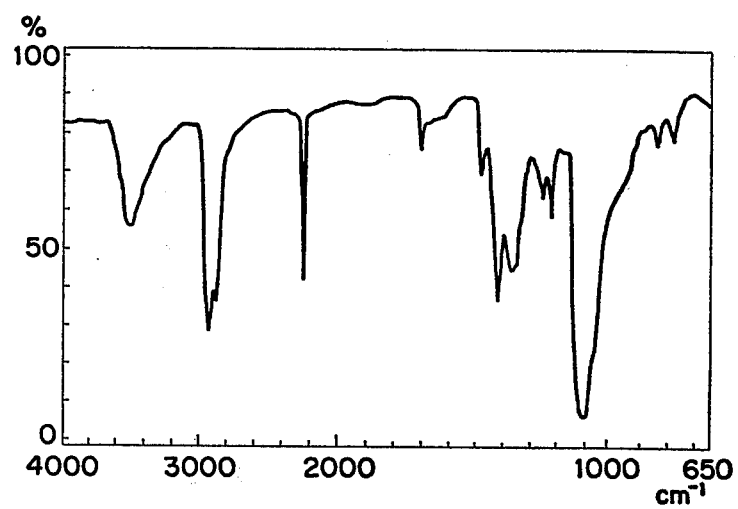
FIG. 4 is an infrared absorption spectrum of a cyanoethylated polyvinyl alcohol as a related compound of cyanoethylpullulan.

Preparation of cyanoethylated polyvinyl alcohol (cf. Japanese Patent Publication 44-6826): into a flask equipped with a stirrer were introduced 0.9 part of a polyvinyl alcohol (Poval C-25, a product by Shin-Etsu Chemical Co.) and 10 parts of hot water to form an aqueous solution of the polyvinyl alcohol and, after cooling, a mixture of 10 parts of a 10% aqueous solution of sodium hydroxide, 8.5 parts of acrylonitrile and 7.5 parts of acetone was added to the solution to effect the reaction at room temperature for 24 hours. Treatment of the reaction mixture was carried out in the same manner as in Example 1 to give 1.71 parts of white cyanoethylated polyvinyl alcohol, of which the nitrogen content as determined by the Kjeldahl method was 13.9% and the infrared absorption spectrum was as shown in FIG. 4.

EXAMPLE 2

Into a flask equipped with a stirrer were introduced 7 parts of the same pullulan as used in Example 1 and 3 parts of acrylonitrile to disperse the pullulan therein and then 0.4 part of a 10% aqueous solution of sodium hydroxide was added dropwise into the mixture which was heated at 50° C. for 5 hours to effect the reaction. After completion of the reaction, the reaction mixture in a form of dispersion was neutralized by adding 0.06 part of glacial acetic acid and filtered to give crude cyanoethylpullulan as filtered cakes. This crude product was subjected to purification, dehydration and drying in the same manner as in Example 1 to give 1.69 parts of white purified cyanoethylpullulan.

The nitrogen content of this cyanoethylpullulan was 12.4% as determined by the Kjeldahl method corresponding to an average degree of substitution per anhydrous glucose unit of 2.71 and the degree of cyanoethylation of 90.3%. The infrared absorption spectrum of this product was almost identical with that shown in FIG. 2. The dielectric constant of a film shaped with this product was about 21.

TABLE

| Product | Cyanoethyl-pullulan | Cyanoethyl-cellulose | Cyano-ethylated polyvinyl alcohol |
|---|---|---|---|
| Nitrogen content, % | 12.1 | 12.5 | 13.9 |
| Thermal decomposition temperature, °C. | 200 | 160 | 150 |
| Solubility in: | | | |
| acetone | A | B | B-C |
| methylethylketone | C | C-D | C |
| acrylonitrile | A-B | B | B-C |
| acetonitrile | A | B | B-C |
| nitromethane | A | A | A |
| pyridine | A | A | A |
| dimethylsulfoxide | A | A | A |
| dimethylformamide | A | A | A |
| methylene chloride | C | D | A |
| Film: | | | |
| clarity | good | slightly cloudy | good |
| adhesion | good | not bonded | good |
| heat resistance | no change | no change | colored and shrinked |

EXAMPLE 3

The same experimental procedure as in Example 2 was repeated except that the amount of the acrylonitrile was decreased to 1.5 parts to give a white product of cyanoethylpullulan.

The nigrogen content of this product was 9.2% as determined by the Kjeldahl method corresponding to an average degree of substitution per anhydrous glucose unit of 1.64 and the degree of cyanoethylation of 54.7%.

What is claimed is:
1. A cyanoethylpullulan.
2. A cyanoethylpullulan having a degree of cyanoethylation of at least 50%.

* * * * *